UNITED STATES PATENT OFFICE.

JOHN W. BARWELL, OF WAUKEGAN, ILLINOIS, ASSIGNOR TO BLATCHFORD CALF MEAL COMPANY, OF WAUKEGAN, ILLINOIS, A CORPORATION OF ILLINOIS.

FOOD PRODUCT AND PROCESS OF MAKING SAME.

1,409,435. Specification of Letters Patent. Patented Mar. 14, 1922.

No Drawing. Application filed December 5, 1918. Serial No. 265,358.

*To all whom it may concern:*

Be it known that I, JOHN W. BARWELL, a citizen of the United States, residing at Waukegan, in the county of Lake and State of Illinois, have invented certain new and useful Improvements in Food Products and Processes of Making Same, of which the following is a specification.

The present invention relates to a food product which is preferably supplied in a dried or powdered condition, and which may be readily mixed with a suitable liquid such as water or milk to form a drink or beverage, and also to the process of manufacturing such food or compound.

The objects of this invention are to provide a food product which will be particularly appetizing and pleasing; to provide a food product which may be provided in a dried condition and is not apt to readily deteriorate; to provide a food product which may be readily mixed with water, milk or the like, to form a beverage; and in general to provide such an improved food product as will appear more fully from the following description, and also to provide an improved process or method of manufacturing such product.

My improved food consists primarily or mainly in a combination of what is commonly known as malted milk and honey. These ingredients may be combined in any suitable proportions and preferably dried to form a dry product. It will also be understood that other ingredients may be added for the purpose of flavoring the compound, or to assist in preserving the same.

The process which I utilize in preparing a preferred form of my improved food product is as follows:

A prepared malt liquid is made by boiling about 50 lbs. of ground malt, and about 30 lbs. of wheat flour in water for a suitable length of time. This is then permitted to cool and is strained, and 50 lbs. of such liquor is combined with approximately 12 lbs. of strained honey, 24 gallons of fresh milk, 11¼ oz. of salt and 5¼ oz. of phosphate of soda. These combined ingredients are thoroughly mixed and reduced to a partially dried state by heating in a vacuum pan. The semi-dried mixture is then combined with about 7 drams of sodium bicarbonate to every 3 lbs. thereof, and the remaining moisture in the mixture is extracted by heating in vacuum ovens. The dried product is then preferably ground to a fine granular state and placed in suitable containers ready for use.

This granular material is more or less soluble in water or milk, and may be mixed with either of such liquids to provide a wholesome and agreeable drink, having such desirable properties as will be readily understood by those familiar with such products.

From the above description it will be readily seen that I provide a novel food product of such composition that it will recommend itself for general use, as well as being particularly adapted as a food for babies, invalids and convalescents.

Having thus described my invention, which, however, I do not wish to limit to the exact proportions or to the exact steps in the process set forth, except as specified in the following claims, what I claim and desire to secure by Letters Patent is:

1. A food comprising a composition of solids formed by drying a suitable amount of extract made from malt and flour, a less amount of strained honey, milk and suitable condiments, substantially as described.

2. The method of making a food product which consists in forming an extract of malt and flour, then mixing said extract with strained honey, milk, salt and phosphate of soda, and reducing such mixture to a partially dried state, and then combining the mixture with sodium bicarbonate and extracting the remaining moisture.

3. The herein described method which consists in preparing a malt liquid by boiling approximately 50 lbs. of ground malt and 30 lbs. of wheat flour in water; then permitting the extract to cool and straining the same; then combining approximately 50 lbs. of such extract with approximately 12 lbs. of honey, 24 gallons of fresh milk, 11¼ oz. salt, and 5¼ oz. of phosphate of soda; then mixing said composition and reducing the same to a partially dried state, then combining the mixture in the proportion of 3 lbs. thereof with 7 drams of sodium bicarbonate, driving off the remaining moisture, and then grinding the dried product.

4. A food comprising a composition of the solids, formed by drying approximately fifty pounds of extract made from malt and flour, twelve pounds of strained honey, twenty-four gallons of fresh milk, eleven and one-fourth ounces of salt, and five and one-fourth ounces of phosphate of soda.

JOHN W. BARWELL.